United States Patent [19]

Shaw et al.

[11] 3,828,482
[45] Aug. 13, 1974

[54] FINISHING MACHINES WITH A WORKPIECE CONVEYING SYSTEM

[75] Inventors: James Thomas Shaw; Raymond Percy Arthur Lilley, both of Peterborough, England

[73] Assignee: Baker Perkins Limited, Peterborough, England

[22] Filed: Sept. 21, 1972

[21] Appl. No.: 291,078

[30] Foreign Application Priority Data
Oct. 6, 1971  Great Britain..................... 46542/71

[52] U.S. Cl.................. 51/121, 51/240 T, 90/21 A
[51] Int. Cl.............................................. B24b 7/06
[58] Field of Search............. 51/109, 121, 91, 72 L, 51/74 R, 240 R, 240 T, 240 A, 122, 216 WD, 123 G, 93, 95 R; 83/410, 411, 412, 914; 90/21 R, 21 A, 83, 78

[56] References Cited
UNITED STATES PATENTS

| 742,356 | 10/1903 | Roberts | 90/21.2 |
|---|---|---|---|
| 1,704,855 | 3/1929 | Chase | 51/241 R X |
| 1,949,097 | 2/1934 | Armitage | 90/21.2 |
| 1,994,221 | 3/1935 | Kearney et al | 90/21.2 |
| 2,592,821 | 4/1952 | Powell | 90/21.2 X |
| 2,774,131 | 12/1956 | Crane | 83/169 |

*Primary Examiner*—Othell M. Simpson
*Assistant Examiner*—Nicholas P. Godici
*Attorney, Agent, or Firm*—Larson, Taylor & Hinds

[57] ABSTRACT

A snag or flash cutting or grinding machine has a stationary cutting or grinding head and a system for conveying a workpiece around a closed circuit having an operative run passing the cutting or grinding head. Apparatus is provided for turning the workpiece if required during inoperative run portions of the circuit so that successive workpiece faces can be presented to the cutting or grinding head during successive circuits and a guide system ensures correct alignment of each face relative to the cutting or grinding head.

11 Claims, 4 Drawing Figures

PATENTED AUG 13 1974

PATENTED AUG 13 1974                3,828,482

FINISHING MACHINES WITH A WORKPIECE CONVEYING SYSTEM

This invention relates to machines for performing operations in the class of snag or flash grinding or cutting which are also referred to hereinafter as finishing machines.

The invention provides a snag or flash grinding or cutting machine comprising a stationary grinding or cutting head, and means for automatically transporting a workpiece to be machined around a closed circuit including an operative run portion passing said grinding or cutting head and an inoperative run portion including means for turning the workpiece if required to present different faces thereof to the grinding or cutting head on successive circuits wherein a freely rotatable means is provided for mounting a workpiece on said workpiece transporting means, and a stationary guide bar adapted to be engaged by follower means associated with said freely rotatable means during operative run portions of said path to provide required alignment and positioning of successive workpiece faces relative to the grinding or cutting head.

According to another feature of the invention, the means for turning the workpiece comprises apparatus for automatically turning a rotary work-table of the machine about its axis, through a predetermined angle, during linear movement of the table along a path, said apparatus including stationary friction means adapted to engage complimentary friction means on the table during movement of the table along the path, continued movement of the table along the path effecting interaction of the friction means to turn the table about its axis, and the duration of interengagement between the friction means determining the degree of turning of the table. Conveniently the stationary friction means is adjustable for position along said path and situated at one end of the path (preferably the terminal end so that the respective friction means remain in engagement at the terminal end of the path,) whereby adjustment of the position of the stationary friction means along the path determines the duration of interengagement between the respective friction means to determine the degree of turning of the table. The respective friction means may comprise gear means.

The invention will now be described by way of example with reference to the accompanying drawings in which.

Figure 1:
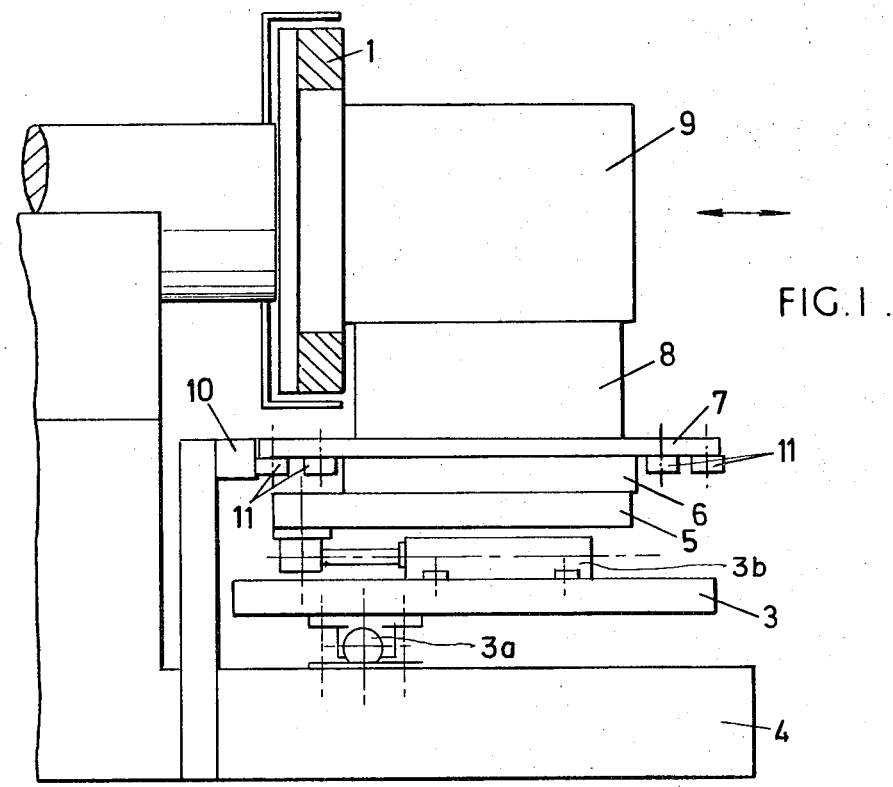
FIG. 1 is a semi-diagrammatic end view of a snag grinding machine.
Figure 2:
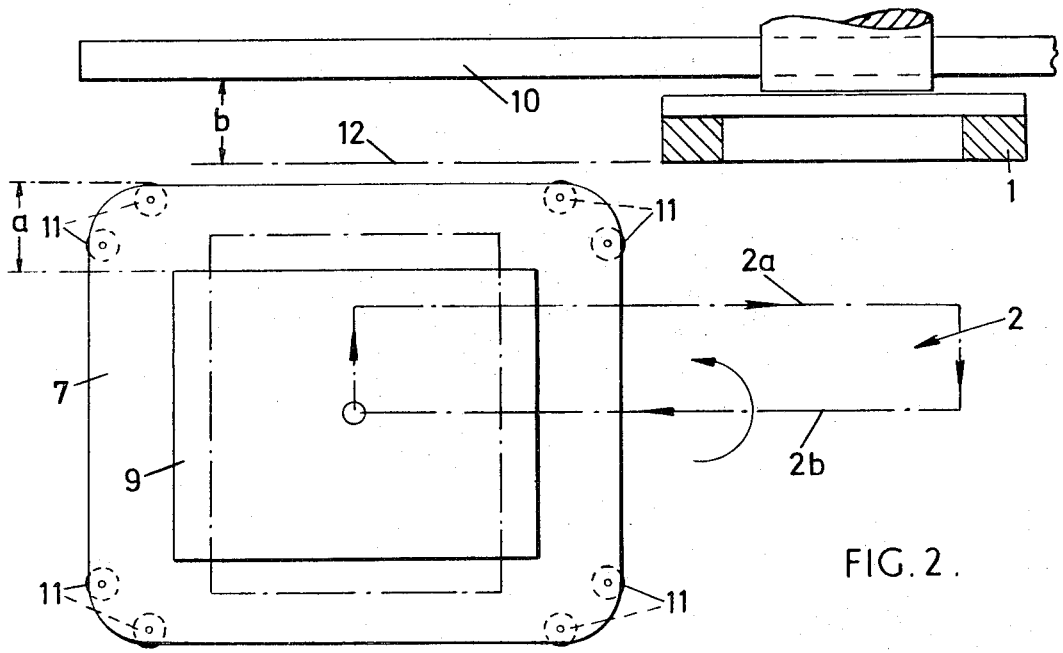
FIG. 2 is a plan view of the machine.

Referring to FIGS. 1 and 2, a snag grinding machine has a stationary grinding wheel or cutter 1 mounted on a horizontal axis and apparatus for automatically transporting a casting in a closed circuit 2 (FIG. 2) having an operative portion 2a during which a surface of the casting is passed across the grinding wheel or cutter and an inoperative portion including a return path 2b during which the casting can be turned automatically through a predetermined angle to present another surface for grinding during the succeeding circuit.

The workpiece transporting means comprises a longitudinal traverse table 3 mounted on slides or tracks (not shown) on a machine base 4, movements of the table along portions 2a and 2b being effected by a piston and cylinder assembly 3a. Mounted on like slides or tracks on table 3 is a cross-feed table 5 movements of which are also effected by a further piston and cylinder assembly 36. The cross-feed table carries a freely rotatable rotary table 6 on which is mounted a replaceable plate 7, designed for a particular workpiece being machined and a workpiece fixture 8 for a workpiece 9, the workpiece being clamped to the fixture by a clamp (not shown) mounted on the cross-feed table and preferably being of the type disclosed in copending U.S. Pat. application Ser. No. 290,799, filed Sept. 21, 1972, and entitled "Clamping Mechanism."

An adjustable guide bar 10 is provided for aligning and guiding the workpiece during the operative run portions 2a of the circuit, in conjunction with pairs of rollers 11 mounted on the underside of each edge of the plate 7. The plate 7 and fixture 8 for a particular workpiece is designed such that the distance "a" between the operative edges of each pair of rollers and the respective workpiece face to be ground is equal to the distance "b" between the roller-engaging surface of the guide bar 10 and the grinding or cutting line 12 (which is an extension of the operative surface of the grinding wheel or cutter 1.) With this arrangement, due to the freely rotatable nature of rotary table 6, the rollers 11 will accurately align the workpiece on guide bar 10 as they are brought into contact therewith by the cross-feed table and held in pressure contact with the guide bar during the working run by the cross-feed table cylinder. It is convenient to set the guide bar at a small angle to the grinding or cutting line to prevent back cutting.

In use, the workpiece is carried around the circuit by forward and reverse operation of the two piston and cylinder assemblies under the control of suitable limit switches, and mechanism now to be described is provided for automatically turning the workpiece through a required angle during the return path of the circuit so that successive workpiece faces are presented for grinding or cutting on successive circuits.

Figure 3:
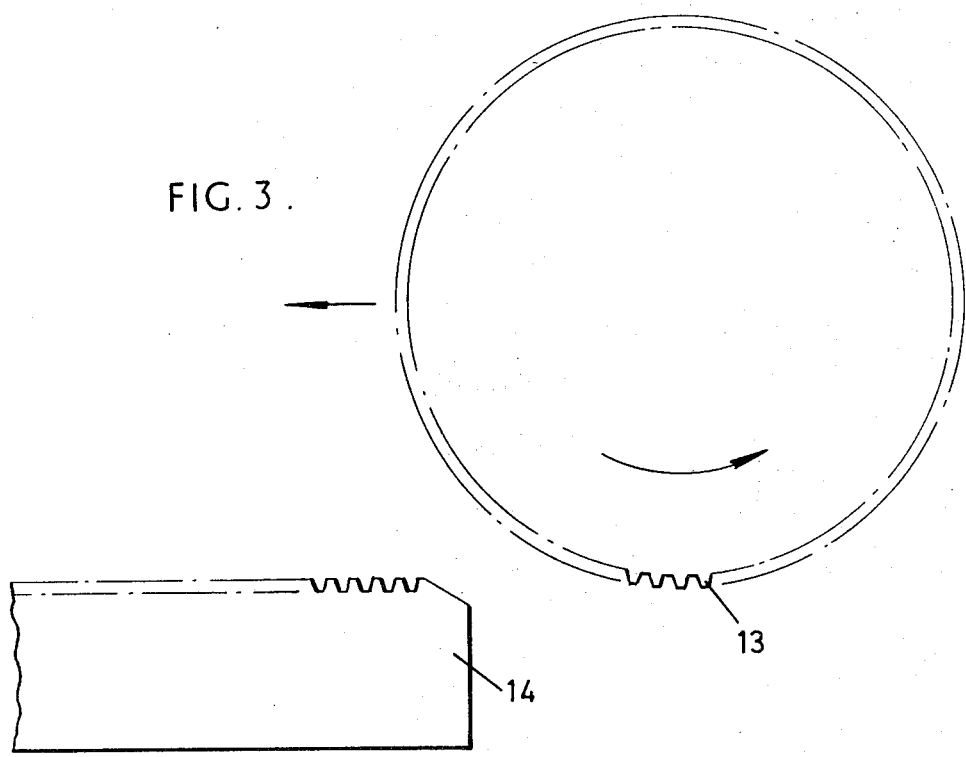
FIG. 3 is a plan view of the turning mechanism of the machine.
Figure 4:
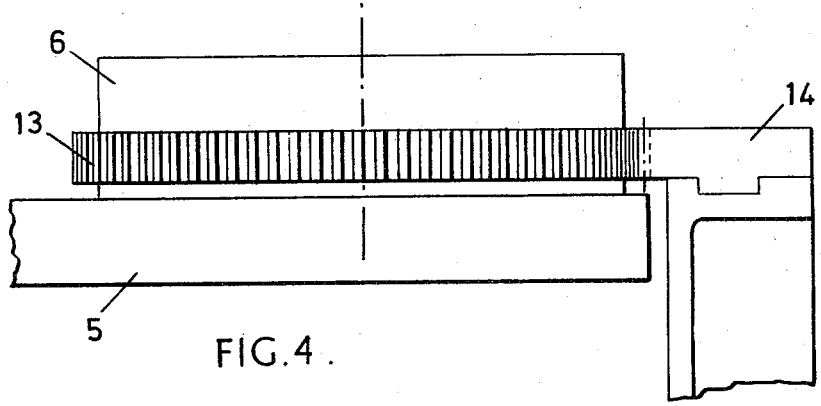
FIG. 4 is an end view of the turning mechanism.

The turning mechanism is illustrated in FIGS. 3 and 4 and comprises a ring gear 13 on the rotary table which is adapted to mesh with a stationary rack 14 towards the end of the return portion 2b of the circuit to rotate the table through a required angle depending on the duration of the intermeshing action. The rack is positioned so that the ring gear remains in mesh at the end of the return path to provide a braking effect, and the rack is adjustable in the direction of the return path so as to vary the meshing duration and thus adjust the angle through which the workpiece is turned. The machine can be programmed to accommodate different turning angles for successive circuits by automatic movements of the rack, and whilst the illustrated example shows a workpiece with four faces at right angles to each other, of course, workpieces with any number of faces at any angle to each other can be accommodated by suitable design of table 7 and rollers 11, and by suitable adjustment of the rack 14. A stationary friction bar and a friction surface on the rotary table may be employed in place of the rack and ring gear.

We claim:

1. A finishing machine comprising a stationary tool head for supporting a finishing tool, and means for automatically transporting a workpiece around a closed circuit including an operative run portion passing said finishing tool and an inoperative run portion including means for turning the workpiece as desired to present different faces thereof to the finishing tool on successive circuits wherein a freely rotatable means is provided for mounting a workpiece on said workpiece transporting means, and a stationary guide bar adapted to be engaged by follower means associated with said freely rotatable means during operative run portions of said path to provide required alignment and positioning of successive workpiece faces relative to the finishing tool.

2. A machine as claimed in claim 1 wherein said means for transporting the workpiece comprises longitudinal traverse and cross-feed tables.

3. A machine as claimed in claim 2 including fluid-pressure means associated with said longitudinal traverse table and further fluid pressure means associated with said cross-feed table for moving said tables to transport a workpiece around said circuit.

4. A machine as claimed in claim 3 wherein one of said fluid pressure means is adapted to maintain contact between said guide bar and said follower means during operative run portions of said path.

5. A machine as claimed in claim 1 wherein said freely rotatable means comprises a rotary table adapted to receive a plate carrying pairs of rollers at the edges of said plate, said rollers constituting said follower means.

6. A machine as claimed in claim 1 wherein the guide bar is adjustable to vary its angle relative to a finishing line of the machine.

7. A machine as claimed in claim 1 wherein the means for turning the workpiece comprises stationary friction means adapted to engage complimentary friction means on the freely rotatable means during movement of the rotatable means along a path, continued movement of the rotatable means along the path effecting interaction of the respective friction means to turn the rotatable means about its axis and the duration of interengagement between the respective friction means determining the degree of turning of the rotatable means.

8. A machine as claimed in claim 7 wherein the stationary friction means is adjustable for positioning along the path and is situated at one end of the path whereby adjustment of the position of the stationary friction means along the path determines the duration of interengagement between the respective friction means to determine the degree of turning of the rotary means.

9. A machine as claimed in claim 8 wherein the stationary friction means is positioned at a terminal end of the path so that the respective friction means remain in engagement at the terminal end of the path.

10. A machine as claimed in claim 7 wherein the friction means comprise gear means.

11. A machine as claimed in claim 10 wherein the gear means comprise respectiveley a stationary rack and a ring gear on the freely rotatable means.

* * * * *